US008133110B1

(12) United States Patent
Muskin

(10) Patent No.: US 8,133,110 B1
(45) Date of Patent: Mar. 13, 2012

(54) SLOT MACHINE GAMES

(76) Inventor: Jon Muskin, Philadelphia, PA (US)

( * ) Notice: Subject to any disclaimer, the term of this patent is extended or adjusted under 35 U.S.C. 154(b) by 541 days.

(21) Appl. No.: 12/264,149

(22) Filed: Nov. 3, 2008

Related U.S. Application Data

(63) Continuation-in-part of application No. 11/165,563, filed on Jun. 23, 2005, now Pat. No. 7,445,548, which is a continuation-in-part of application No. 10/899,098, filed on Jul. 27, 2004, now abandoned, which is a continuation-in-part of application No. 10/770,449, filed on Feb. 4, 2004, now abandoned.

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2006.01) |

(52) U.S. Cl. ................. 463/20; 463/16; 463/25; 463/29

(58) Field of Classification Search .................... 463/16, 463/20, 25, 29
See application file for complete search history.

(56) References Cited

U.S. PATENT DOCUMENTS

| | | | | |
|---|---|---|---|---|
| 6,471,208 | B2 * | 10/2002 | Yoseloff et al. | 273/143 R |
| 2001/0048193 | A1 * | 12/2001 | Yoseloff et al. | 273/138.1 |
| 2002/0022512 | A1 * | 2/2002 | Higurashi | 463/20 |
| 2005/0159211 | A1 * | 7/2005 | Englman | 463/25 |

* cited by examiner

*Primary Examiner* — David L Lewis
*Assistant Examiner* — Adetokunbo Torimiro
(74) *Attorney, Agent, or Firm* — Muskin & Cusick LLC

(57) ABSTRACT

A method, apparatus, and computer readable storage medium for implementing a slot machine game with cascading reels. Reels and further reels can be spun, allowing for a plurality of lines.

3 Claims, 9 Drawing Sheets

SLOT MACHINE GAMES

CROSS REFERENCE TO RELATED APPLICATIONS

This application is a continuation of application Ser. No. 11/165,563, filed Jun. 23, 2005, now allowed, now U.S. Pat. No. 7,445,548 which is a continuation in part (CIP of application Ser. No. 10/899,098, filed Jul. 27, 2004, now abandoned, which is a continuation in part (CIP) of application Ser. No. 10/770,449, entitled, filed Feb. 4, 2004, "Multi Spin Slot game," now abandoned.

BACKGROUND OF THE INVENTION

1. Field of the Invention

The present invention is directed to a method, device, and computer readable storage medium for implementing a slot machine game with a new and improved mechanism for triggering spinning of reels.

2. Description of the Related Art

Slot Machines are a popular gambling game found in casinos. One disadvantage of current slot machines is that if the first symbol is a blank, then the player typically will lose, but the player must still wait until the second and third reels have spun. Further, slot games in which a player can play multiple lines are becoming more popular with players and more profitable for casinos.

What is needed is a new variety of the game that can be more profitable for the casino, as well as in a form that some players may prefer over a standard slot game.

SUMMARY OF THE INVENTION

It is an aspect of the present invention to provide improvements and innovations in slot machine games, which increase player enjoyment and casino profitability. The above aspects can be obtained by a method that includes (a) displaying a first symbol; (b) displaying a plurality of second symbols, if the first symbol is a predetermined symbol; and (c) displaying a plurality of third symbols for each second symbol which forms a predetermined combination with the first symbol.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Further features and advantages of the present invention, as well as the structure and operation of various embodiments of the present invention, will become apparent and more readily appreciated from the following description of the preferred embodiments, taken in conjunction with the accompanying drawings of which.

DESCRIPTION OF THE PREFERRED EMBODIMENTS

Figure 1:
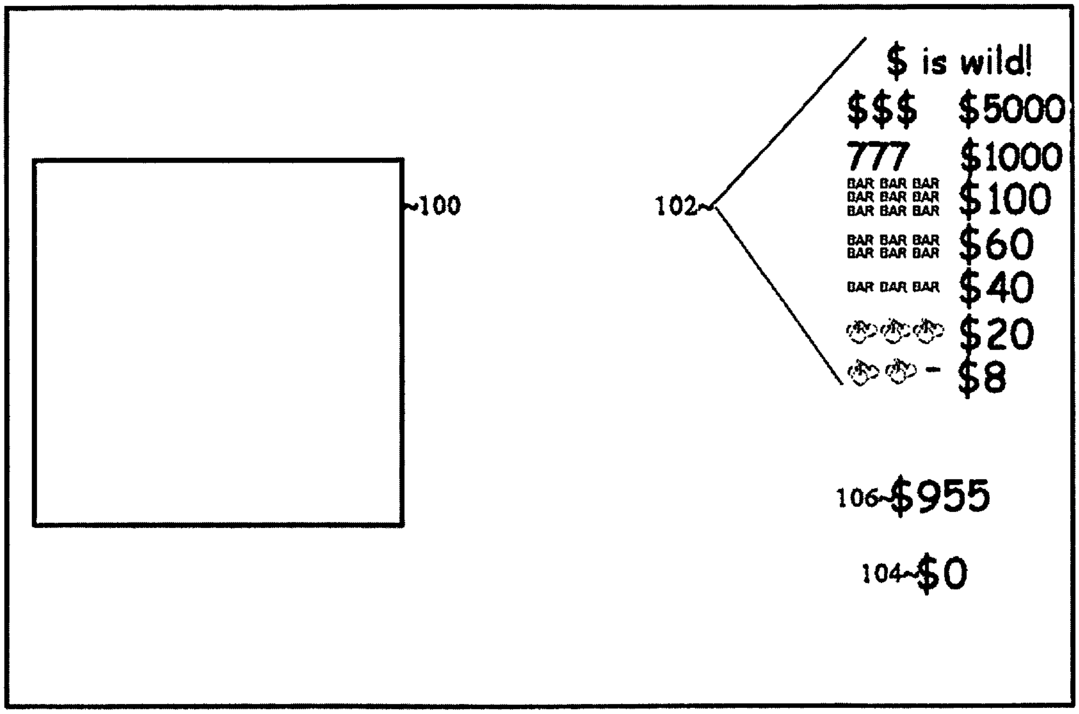
FIG. 1 is a first screen shot illustrating an example of the present invention, according to an embodiment of the present invention.

Reference will now be made in detail to the presently preferred embodiments of the invention, examples of which are illustrated in the accompanying drawings, wherein like reference numerals refer to like elements throughout.

The present invention relates to slot machine games and improvements thereof. The present invention provides for a slot machine game that spins a first reel, and if a winning combination is possible, spins additional reels, and possibly subsequent reels thereafter.

The easiest way to describe the game is by way of example, although the present invention is not limited to this particular configuration. A player bets $9 ($1 for 9 lines). A first slot reel is spun. If the first reel is a blank, then the game is over and the player has lost his entire $9.

If the first reel is not a blank, then it is possible for the player to receive a winning combination. So then a set of three second reels are spun. If all three of these second reels are blank (or do not otherwise form a predefined combination), then the game is over and the player has lost his entire $9. This is assuming that in this configuration there does not exist a winning combination comprised of only one symbol (such as a left cherry).

If any of the second reels match the first reel (or can possibly form a winning combination with the first reel), then a set of three third reels are spun for each respective second reel. This set of third reels is associated with the particular second reel that matches the first reel. If all of the second reels match the first reel, then three sets of three third reels are spun.

Once the third reels are all spun (in this configuration, the number of third reels spun can be 0, 3, 6 or 9), then winning combinations are identified. For each third reel spun, it is matched up with its respective second reel and the first reel. If this comprises a winning combination, then the player is paid that amount.

Thus, by betting $9 in this triple/triple configuration, the player is effectively betting 9 lines at a time. However, this game progresses quicker than if the player played 9 separate slot pulls. Further, the player gets the excitement of getting multiple tries to make a winning combination. For example, if the player gets a wildcard on the leftmost symbol, then the player gets 3 tries (instead of the one try on a standard 3 reel game) to get another wildcard. If the player does get another wildcard on the second set of reels, then the player gets an addition 3 tries to get another wildcard. Thus, the player gets more tries at making winning combinations. Typically, the player pays for nine lines up front.

FIG. 1 is a first screen shot illustrating an example of the present invention, according to an embodiment of the present invention.

A first reel 100 is spun which ends up in a blank symbol in this example. Because the first reel is a blank, the game is typically over and no other reels are spun. A payout chart 102 shows the valid payouts and how much they pay. A win meter 104 shows how much the current game pays. Since this current game pays nothing, the win meter shows 104. A total credit output 106 shows how many total credits the player has.

Figure 2:
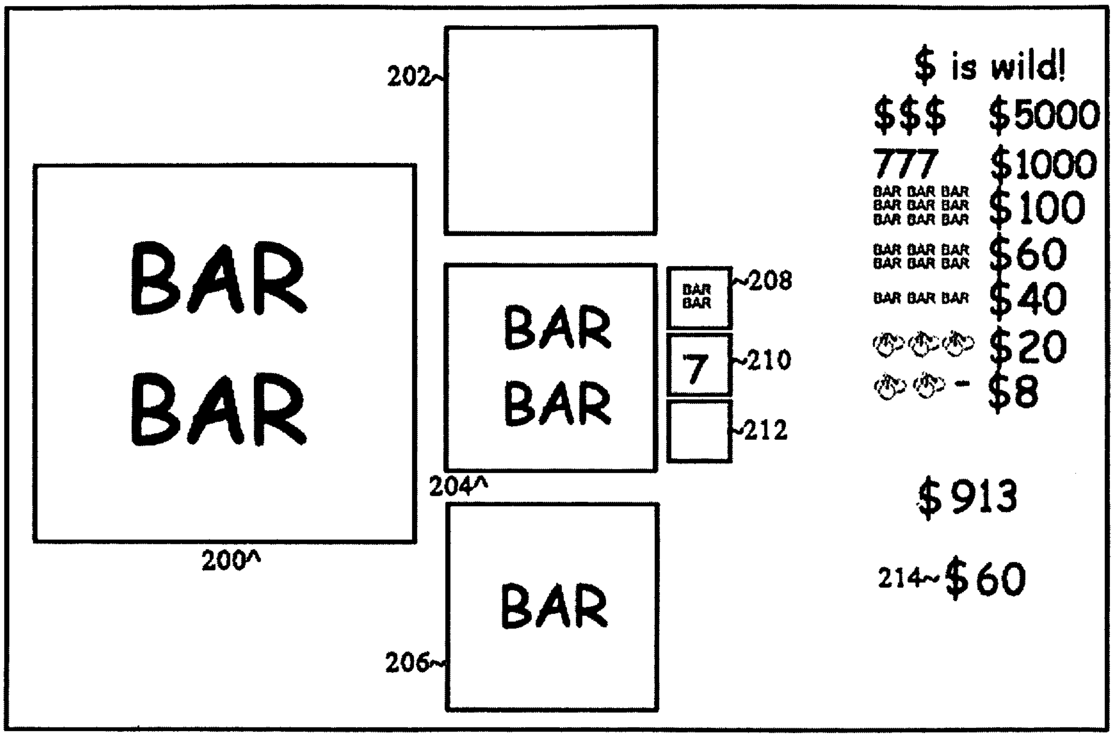
FIG. 2 is a second screen shot illustrating an example of the present invention, according to an embodiment of the present invention.

FIG. 2 is a second screen shot illustrating an example of the present invention, according to an embodiment of the present invention.

This round of the game proceeds as follows. A first reel 200 is spun which results in a double bar symbol.

Since the first reel 200 has resulted in a symbol which can result in a winning combination, a second phase of the game is carried out. A second top reel 202 is spun which results in a blank symbol. Since the first reel 200 is a double bar and the middle top reel 202 is a blank, no winning combination can be formed on the payout chart. Thus the second top reel 202 does not trigger a respective third phase. Next, a second middle reel 204 is spun which results in a double bar symbol. Since the first reel 200 is a double bar and the second middle reel 204 is a double bar, these two symbols can form a winning combination. Thus, this triggers a third phase of the game, to be described below. Next, a second bottom reel 206 is spun which results in a single bar symbol. Since the first reel 200 is a double bar and the second bottom reel 206 is single bar, no winning combination can be formed on the payout chart. Thus the second bottom reel 206 does not trigger a respective third phase.

In this example, a third phase of the game is triggered by the second middle reel. A third set of reels is spun. A third middle top reel 208 is a double bar, which forms a winning combination with the first reel and the second middle reel to form a double bar/double bar/double bar combination. A third middle middle reel 210 is a 7 which does not form a winning combination. A third middle bottom reel 212 is a blank which does not form a winning combination. If the second top reel and/or the second bottom reel were to trigger additional third phases, then these additional reels would be spun and displayed as well alongside their respective second reel trigger. In the 1×3×3 example, the game can have a maximum possible 9 separate wins.

Thus, the game is over and there is one winning combination, a double bar/double bar/double bar, which according to the payout chart pays $60. Thus the win meter 21 displays $60. Of course a game can have multiple wins and the win meter would display the total of each win.

Any of the reels can be spun in any order. In a preferred embodiment, the left most reel is spun, then if possible the second reels are spun (simultaneously or sequentially), then if possible the third reels are spun (simultaneously or sequentially). Alternatively, the left most reel can be spun, then the second top reel can be spun, and if a winning combination can be formed, then a third top top reel, a third top middle reel, and a third top bottom reel can be spun, and then the second middle reel can be spun possibly spawning another third set in this fashion, then the second bottom reel can be spun possible spawning another third set in this fashion.

As can be seen by this example, there are total of 9 possible 3 reel combinations to achieve in the game, but not all 9 may occur at all times. Thus, typically a player can decide how much he or she wants to bet per line (or it can be predetermined at for example $1), and how many lines the player wishes to play (although preferably the player will play as many lines as available, 9 in the above example).

In this manner, the player gets to play multiple lines of a slot machine faster than the prior art, and also gets the excitement of spawning additional reels if he or she catches possible winning combinations. It is also noted that the present invention is not limited to three reels, and any number of reels and any number of spawns can be used. For example, a slot machine can have three columns (a first, second, and third), but spawn four (or any number) of spins in that column. Thus, for example, the above example can spin a first reel, then possibly 4 more reels, then possibly 4 more reels for each of the previous 4 (for a maximum of 16). In addition, other numbers besides 3 of columns can be used, for example there can be 4 columns and any amount of reels in each column, for example, a first reel can spawn 3 more reels, each of which can spawn 3 more reels, each of which can spawn 3 more reels, for a total maximum of 27.

Figure 3:
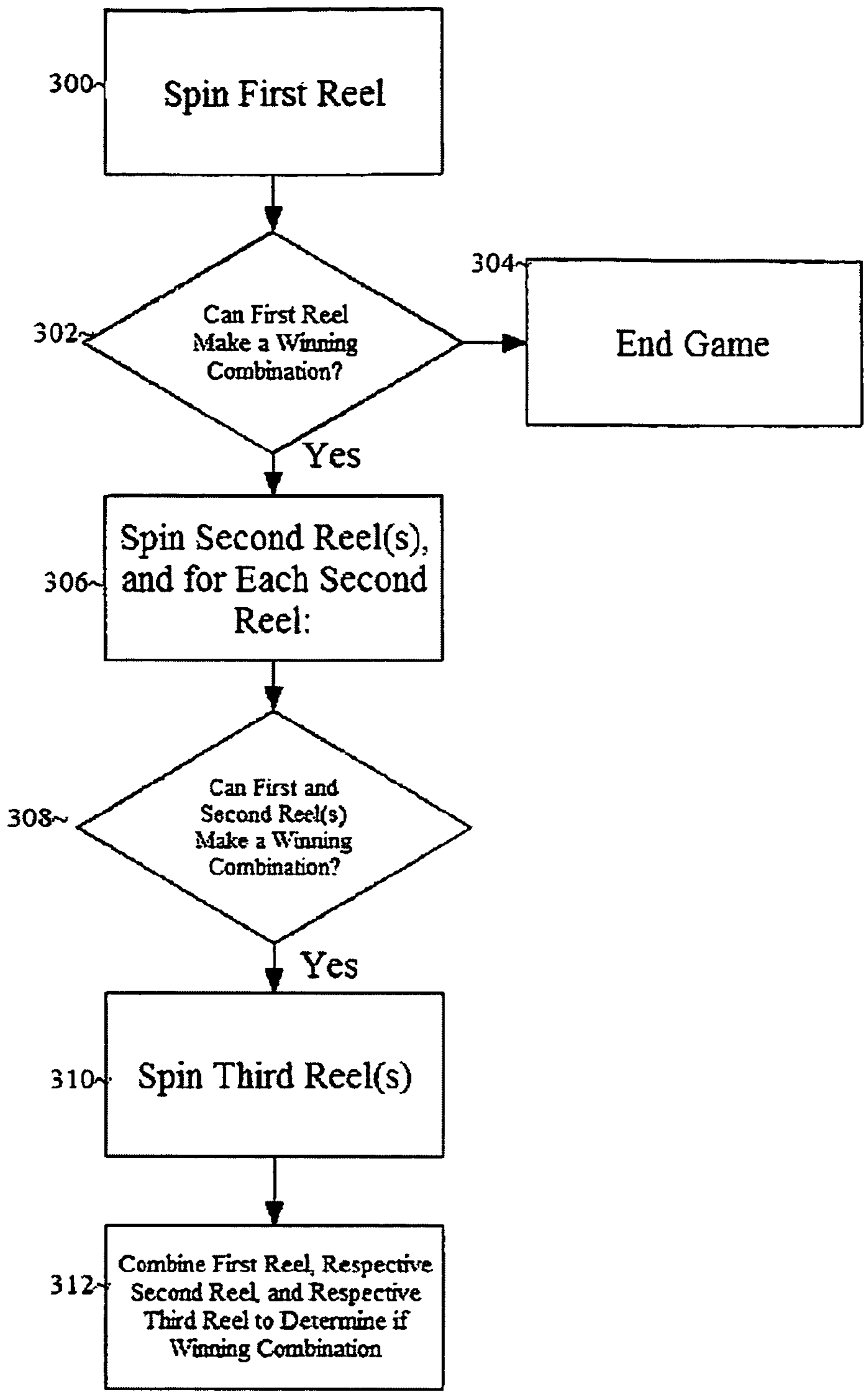
FIG. 3 is a flowchart illustrating a method of implementing the present invention, according to an embodiment of the present invention.

FIG. 3 is a flowchart illustrating a method of implementing the present invention; according to an embodiment of the present invention.

The method starts with operation 300, where a first reel is spun. The method then proceeds to operation 302, which checks if the first reel can form a winning combination (or otherwise meets a condition to trigger further spins). If not, then the method proceeds to operation 304, which ends the current game.

If the check in operation 302 determines that based on the first symbol, the game should proceed to a second phase, then the method proceeds to operation 306 which spins a second reel. For each second reel spun, the method proceeds to operation 308 (and operation 310 and operation 312), which checks if the first and respective second reel can form a winning combination.

If a winning combination can be formed, then the method proceeds to operation 310 which spins (or spawns) a set of third reels. The method then proceeds to operation 312, which determines if there is a winning combination based on the first reel, respective second reel, and respective third reel.

Figure 4:
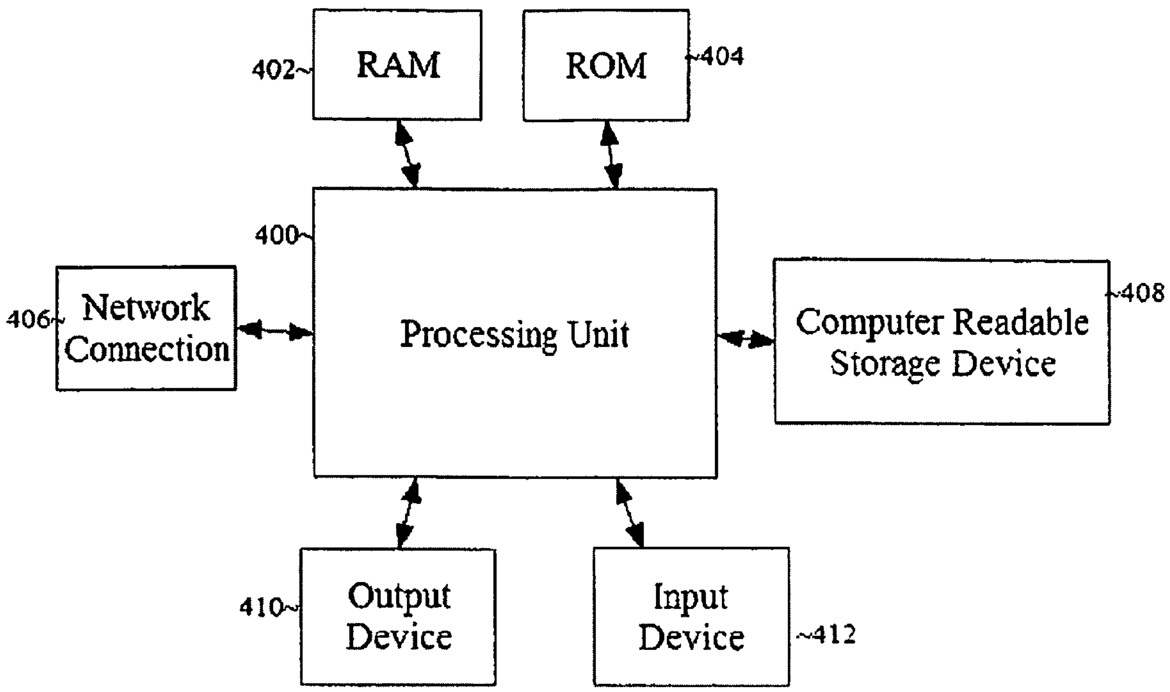
FIG. 4 is a block diagram illustrating an example of hardware used to implement the present invention, according to an embodiment of the present invention.

FIG. 4 is a block diagram illustrating an example of hardware used to implement the present invention, according to an embodiment of the present invention.

A processing unit 400 is connected to a ROM 402, a RAM 404, a network connection 406, a computer readable storage device 408 (storing the program for running the game, i.e. on a CD-ROM, EPROM, or any other memory device), an output device 410, and an input device 412.

Figure 5:
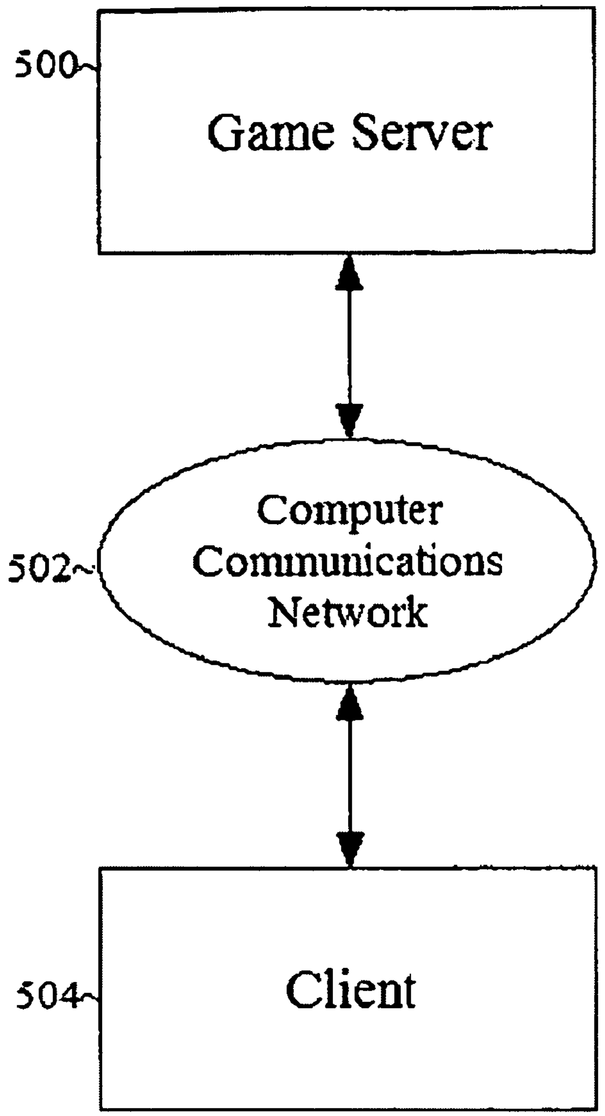
FIG. 5 is a block diagram illustrating an example of hardware used to play the game over a computer communications network, according to an embodiment of the present invention.

FIG. 5 is a block diagram illustrating an example of hardware used to play the game over a computer communications network, according to an embodiment of the present invention.

The present invention can also be played over the Internet, for example by an online casino. A game server 500 serves the game via a computer communications network 502 to a client 504. The client can download the game programming and run the application on the client's computer and just receive random results from the server. Alternatively, the server 500 can run the application and serve the output to the client 504. A user of the client 504 views the output and enjoys the game from a remote location such as his or her home. The reels can also be configured such that the player never gets a blank on the first (or any other) reel.

In a similar but alternate way to display the present invention, all individual reels are displayed and none (or less than all) of the reels do not form combinations with more than one other set of symbols. For example, as game as illustrated in FIGS. 1 and 2 can be displayed by displaying 9 rows of 3 columns of reels. In this embodiment, the first column of reels all spins with a same result. In the second column of reels, the top 3 reels all spin with the same results, the middle 3 reels all spin with the same results, and the bottom 3 reels all spin with the same results. The third column of reels all spin with different results. This has a same result as the game previously described, but just illustrated in a different fashion.

In a further embodiment, weighted reels can be used, as known in the art for example as described in U.S. Pat. No. 4,448,419 to Telnaes. The first reel, second reels, and third reels, can be weighted as a first, second, and third reel is traditionally done. The first reel is preferably heavily weighted towards receiving any symbol, while the third reel is preferably more likely to get blanks than the other two reels. In this way, it will be unlikely that the player will get a blank symbol on the first reel, which would typically upset the player.

Appendix A is one example of program code used to implement an embodiment of the present invention. This code was written in the MACROMEDIA FLASH ACTIONSCRIPT language, although of course any other programming language can be used and this represents merely one possible configuration.

In a further embodiment, more than one symbol can be spun in the first column, one or more symbols can be spun in the second column, and one or more symbols can be spun in the third column. As an example, the game can work in reverse to that described above. For example, 9 reels are spun in the first column, then 3 reels are spun in the second column, then 1 reel is spun in the third column. Typically, a symbol has a group of other symbols associated with the symbol (which is part of the same line). Each symbol in a group may have other symbols associated with it.

In another embodiment of the present invention, a sequence of reels (or other operations to determine random symbols) is spun. If the first in the sequence is a predefined symbol (or forms some type of combination with previous symbols), then a next symbol in the sequence is spun. If the next symbol is a predefined symbol (or forms some type of combination with previous symbols), then a further symbol is spun, and so on.

When the sequence is over (typically when the last symbol is not a predefined symbol or does not form a combination which is defined to further the sequence), then the amount the combination pays out is determined. This can be based on the number of symbols generated in the sequence and/or a pattern or combination those symbols form.

In yet a further embodiment of the present invention, reels of a slot machine can be spun, and one of the reels can be respun (automatically or manually) if a particular condition is satisfied.

For example, three reels of a three reel slot machine can be spun to generate three symbols. If one of the three symbols comprises a predefined symbol (i.e. a wild card, a special respin symbol, or any symbol) then one or more other reels on the machine can be respun. Typically, a blank reel(s) will be respun. The respin can also be automatically triggered on a condition if the reels comprise a winning combination but for one of the reels. For example, if a player gets 7 7 blank, then the game can automatically respin the blank reel. As an example of another embodiment, if a player gets blank 7 wild, wherein the wild symbol also has a respin feature, then the blank symbol can automatically be respun. If the player gets blank blank wild, then both blanks can be respun. The designer of the machine can configure which conditions will trigger an automatic respin.

In a further embodiment, a manual respin can also be triggered by a condition. A manual respin is one where a player can choose which reel to respin. For example, if a wild card has a respin feature, and a player gets 7 bar wild, then the player can choose which symbol (7 or bar) to respin.

Figure 6:
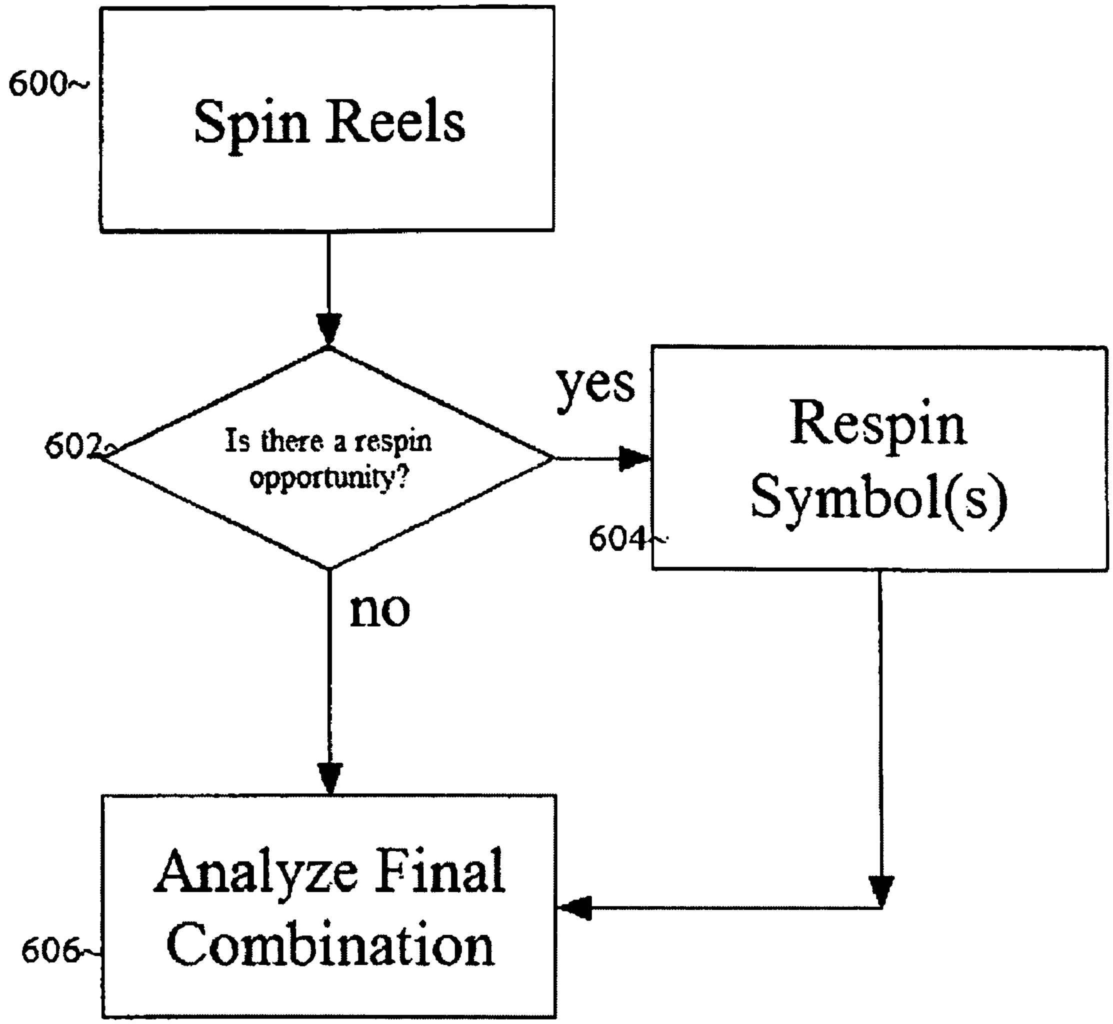
FIG. 6 is a flowchart illustrating a method of allowing for respins, according to an embodiment of the present invention.

FIG. 6 is a flowchart illustrating a method of allowing for respins, according to an embodiment of the present invention.

The method starts with operation 600, which spins reels of a machine (can be any number of reels). The reels can be electronic (i.e. a digital display) or physical reels.

From operation 600, the method proceeds to operation 602 which analyzes the combination of symbols generated by the spins and determines if there is a respin opportunity. The conditions for a respin opportunity depend on the particular design choices made by the game designers.

If the check in operation 602 determines that there is a respin opportunity, then the method proceeds to operation 604, which respins symbol(s). The symbol(s) to be respun depend on the particular design choices made by the game designers. If a manual respin is called for (as opposed to automatic), then the game waits for input from the player as to which reel(s) to respin.

From operation 604, the method proceeds to operation 606, which analyzes the final combination of the game to see if the combination is a winning one. Winning combinations are paid according to a payout chart.

In a further embodiment of the present invention, further spins of the reels is not conditional upon making a winning combination. For example, operations 302 and 308 are not required and can be skipped, thus the further spins of the reels will typically always occur. Either any, all, or any combination of these operations can be optional.

Figure 7:
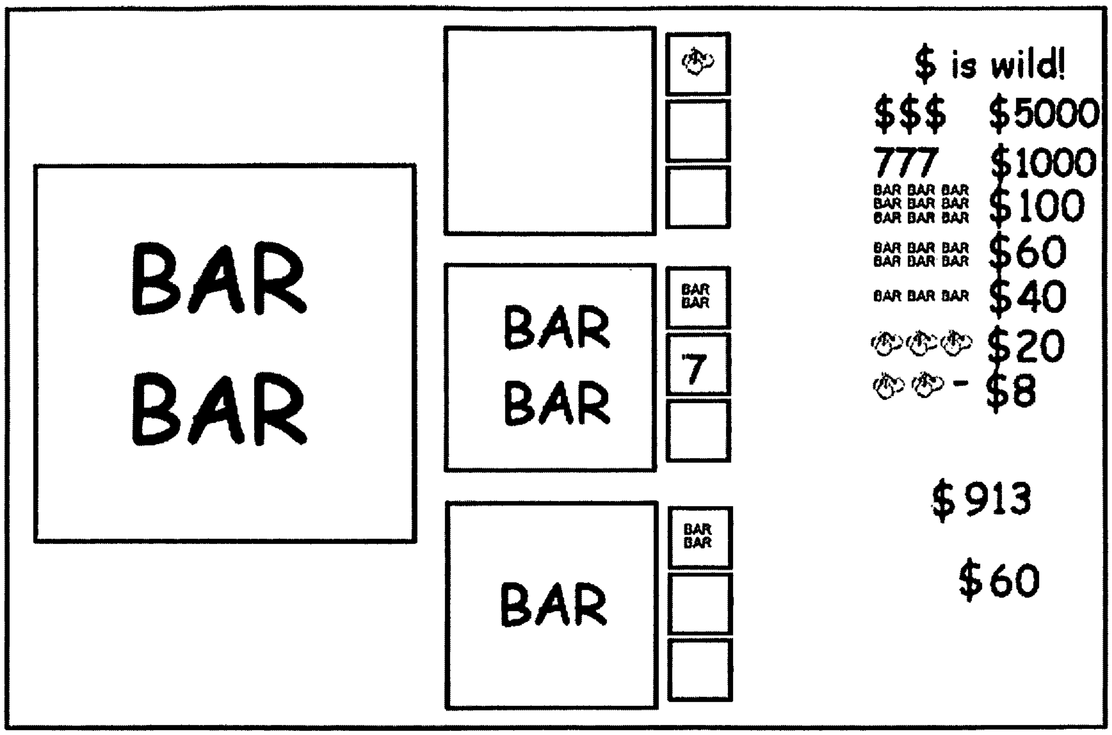
FIG. 7 is a screen shot illustrating a further embodiment of the present invention.

FIG. 7 is a screen shot illustrating a further embodiment of the present invention.

FIG. 7 illustrates the multi spin slot game with nine lines using without conditions for continuing the progression of spins. In this example, the three lines are comprised of the following symbols (from top to bottom): double bar blank cherry; double bar blank blank; double bar blank blank; double bar double bar double bar; double bar double bar 7; double bar double bar blank; double bar single bar double bar; double bar single bar blank; double bar single bar blank. There is only one winning combination herein, the fourth line from the top (double bar double bar double bar). Note how in this embodiment, all reels typically spin regardless of whether a winning combination can be formed or not.

In a further embodiment of the present invention, when a player enters a bonus round, the player can bet credits from his or her regular credits in the machine displayed form the main credit meter. For example, a player has $95 in credits on a slot machine. The player then wins entrance into a bonus game. The bonus game typically will give the player an expected value by virtue of winning entrance into the bonus game without the player having to pay more. However, in this embodiment of the present invention, the player can be given the option to wager more credits from his regular credits. For example, the bonus game may comprise a game wherein a player picks a horse the player thinks will win a race. The player can also be given the option to bet credits from the player's total credits in the machine in order to possibly increase the player's winnings on the bonus game. For example, the player may wish to place an additional $25 bet on a particular horse. Thus, the player's total credits have now gone down to $70. In addition to the inherent expect value amount associated with the bonus game, the player now has another $25 wagered on the bonus game. If the particular horse the player has selected wins, then the player will receive a payoff based on the $25 in additional money the player has bet, in addition to whatever other amount the player would have earned in the bonus round. Thus, the player has "mixed" both: value associated with entrance into the bonus round (money which can be given to the player directly in the bonus round or indirectly by virtue of allowing the player to win prizes) and the player's own money from the machine's credit meter itself (that the player owns and can cash out if he or she wants).

Examples of ways that a player can wager his or her credits into a bonus round can be: picking more (or betting more on) horses (or other racing elements) to win a race; betting to receive more picks when uncovering elements; paying to continue a bonus round after the player has been eliminated from the bonus round. There are many ways to be terminated in a bonus round, for example if the bonus round comprises uncovering elements, the bonus round may be terminated when the player uncovers a special elements (such as a devil, etc.) Thus, once terminated, the player can pay more from his credits to continue the bonus round. Other ways a player can wager his or her credits into a bonus round are: the player can pay to have the expected value of the bonus round increased (for example a particular cost to the player may cause the dollar amounts of all of the prizes in the bonus round to double; the player may be given the opportunity to play the bonus round a second time if he pays a specified amount. It is also possible a bonus round can give a player a particular amount (i.e. $50) to place on special wagers for the bonus game (i.e. a horse race). The player can bet with the $50 the player is given, or decide to augment the amount he can bet with in the bonus round by also using credits from the main credit meter. Thus if the player wishes to bet with $25 additional from the main credit meter, and the bonus round initially gives the player $50, then the player now has $75 to wager with in the bonus round.

Figure 8:
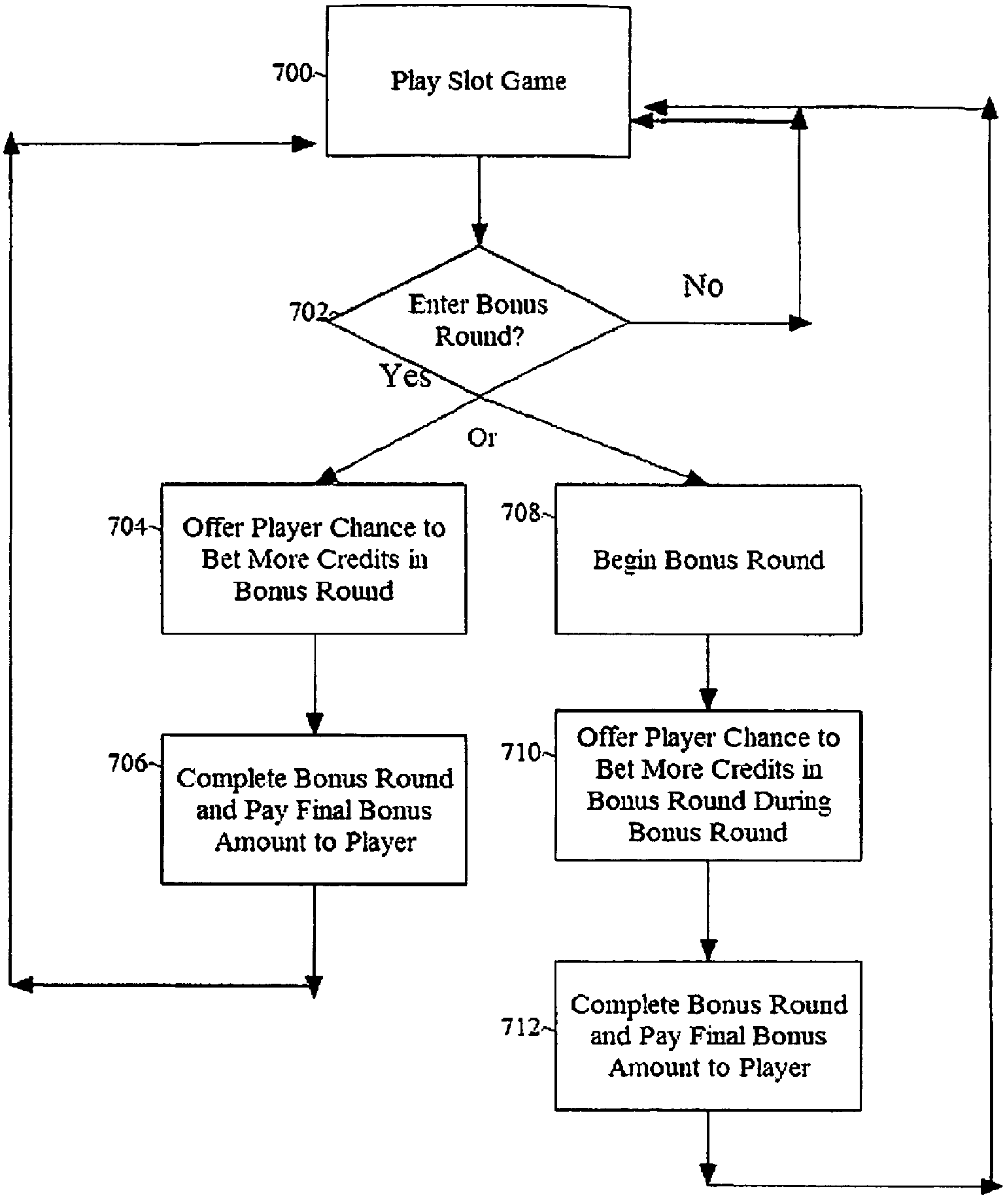
FIG. 8 is a flowchart illustrated a method of wagering credits into a bonus game, according to an embodiment of the present invention.

FIG. 8 is a flowchart illustrating a method of wagering credits into a bonus game, according to an embodiment of the present invention.

The method starts in operation 700, which plays a round of a slot game as known in the art. From operation 700, the method proceeds to operation 702, which determines whether the slot game has entered a bonus round. If the slot game has not entered the bonus round, then the method returns to operation 700 which continues the game.

If the check in operation 702 determines that the slot game has entered a bonus round, then the method can proceed to operation 704 which offers the player a chance to bet more credits in the bonus round. If the player wishes to use credits from the machine (i.e. credits from the main credit meter, not credits awarded in the bonus game), then the credits that the player bets will be taken out of the player's main credit meter.

From operation 704, the method proceeds to operation 706 which completes the bonus round and pays the final bonus amount to the player. The method can then return to operation 700 which starts a new game.

Alternatively, from operation 702, the method can proceed to operation 708 which begins the bonus round (as known in the art). During the bonus round play, the method can proceed to operation 710 which then offers the player a chance to bet more credits during the bonus round. This can happen, for example, if the player has terminated the bonus round but the player wishes to play on. Or else the player can be offered an additional wager during the bonus game that the player can pay for using credits from the main credit meter. Any of the types of additional wagers described herein, or known in the art, can be used to accept an additional wager from the player.

From operation 710, the method can proceed to operation 712, which completes the bonus round and pays a final bonus amount to the player. It is also noted, that the bonus round can continue from operation 710 and then accept additional wagers from the player's credit meter (i.e. the invention is not limited to just accepting one additional wager). The additional wagers can be made at the same time or throughout the course of the bonus round.

From operation 712, the method can then return to operation 700 which starts a new game.

In yet a further embodiment of the present invention, a bonus round of a slot game can be triggered and valued. A bonus round of a slot game which is triggered by a special even which provides the player with an additional game to play for a monetary or other prize. The trigger can be a special bonus symbol(s) appearing on all or some reels or paylines, a special combination appearing on paylines or reels in general, a random event, etc. Multiple bonus rounds can be triggered in the same game. For example, a game with multiple lines may trigger a bonus round when a special symbol appears on the final reel.

Bonus rounds typically have an expected value. For example, a particular bonus round/game can have an expected value of $50. This means that the player will win an average of $50 over the long run. If the player gets more than one special symbol on the final reel of two paylines, the player may feel shortchanged that he or she gets only one bonus round.

Therefore, the value of the bonus round can be adjusted according to how many bonus rounds the player has earned. For example, if the player has earned two bonus rounds (for example by receiving two special symbols on two paylines), then the value of the bonus round can be doubled. If the player earns X bonus rounds in a game, then the value of the standard bonus round can be multiplied by X. The value of the bonus round does not have to be X*expected value of standard bonus round, but the increased value, bonus round can incorporate X such that the player is rewarded for obtaining multiple bonus round triggers. For example, the standard bonus round can be worth $50; two earned bonus rounds can be worth $75; three can be worth $100; four can be worth $200; etc. The increased value of the bonus round can be passed on to the player by increasing a value of awards a player can win in the bonus round.

The general concept is thus to reward a player who earns more bonus rounds in a single game/spin of a multi line slot machine. In the multi spin slot game described herein, if a bonus round is triggered by a special symbol or combination, in the 1/3/9 reel configuration, the player can earn up to a maximum of 9 bonus games (since there are 9 lines). The player can then receive an increased value bonus round with a value of 9 times the standard expected value of the standard bonus round. Earning 9 bonus rounds in one game/spin/round may be very unlikely, but it would be more likely to earn two bonus rounds in a single game/spin/round (i.e. getting a trigger on 2 lines in a game). Thus a player earning 2 bonus games will be rewarded with a bonus game with double the expected value of a standard game (for example all payouts can be doubled).

Other ways a bonus round's expected value can be increased can be to give the player more picks. For example, some bonus rounds give a player a certain amount of picks at revealing elements with prizes behind the elements. For example, a bonus round can display 10 elements (i.e. doors, boxes, etc.) and the player gets to pick 3 of the elements. Each time an element is picked, a dollar amount (or other prize) is revealed that the player has won. If a standard bonus round allows the player 3 picks, a doubled bonus round can allow the player more picks (i.e. 6). The number of picks and/or prizes can be adjusted so that the expected value of the double earned bonus game is double the expected value of the standard game.

Figure 9:
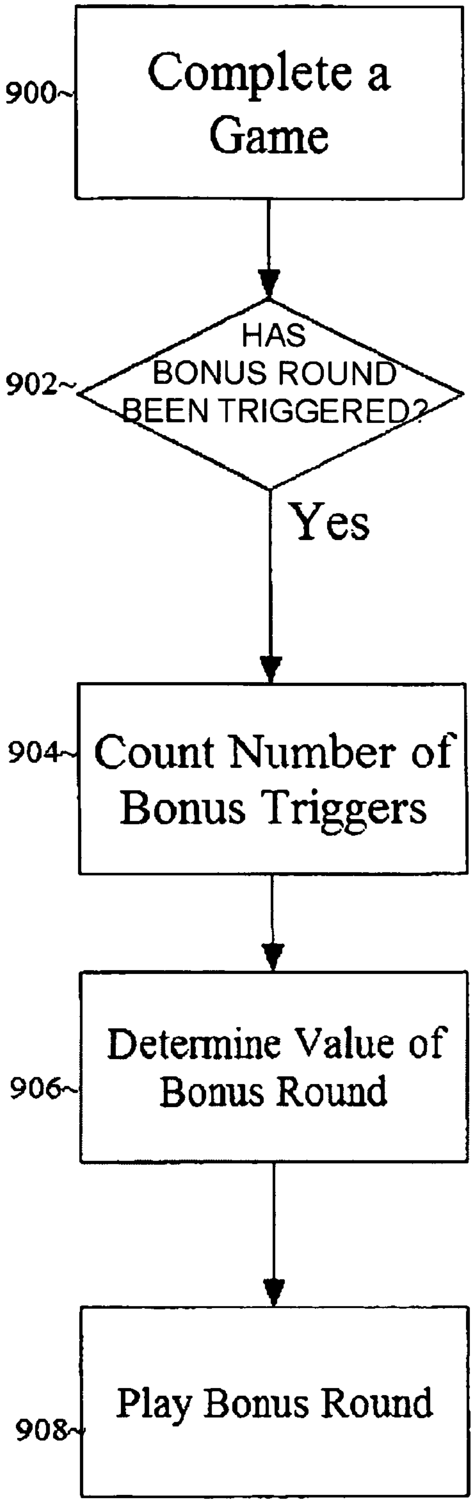
FIG. 9 is a flowchart illustrating a method of determining a bonus round value, according to an embodiment.

FIG. 9 is a flowchart illustrating a method of determining a bonus round value, according to an embodiment.

The method starts at operation 900, wherein a machine completes a game. This can be accomplishes as known in the art such as spinning (physical of virtual) reels and determining which lines have won. Winning lines can be indicated to the player.

From operation 900, the method proceeds to operation 902, which determines whether a bonus round has been triggered. If at least one active line comprises a bonus trigger, then a bonus round has been triggered. If a bonus round has not been triggered, then the method can continue as any prior art slot machine (not pictured), e.g. award any winnings and wait for player to play again.

If the determination in operation 902 determines that a bonus round has been triggered, then the method proceeds to operation 904 which counts a number of bonus triggers. Each line that triggers a bonus round is a bonus trigger.

From operation 904, the method then proceeds to operation 906, which determines a value of a bonus round. This can be accomplished by multiplying the number of bonus triggers determined in operation 902 by an expected bonus round value for each bonus trigger. Alternatively, instead of determining an overall value of the bonus round, values of individual awards in the bonus round can be determined. For example, award amounts (e.g. a dollar value for an icon that a player can select) in a bonus round can be multiplied by the number of bonus triggers. Alternatively, this can also be accomplished by using a predetermined table (or mathematical equivalent) for a number of bonus triggers and a respective expected value (or respective award amounts in a bonus round). In this way, awards do not have to be direct multiples of a number of bonus triggers. For example, a standard (one trigger) bonus round can have three symbols (A, B, C) with values of ($1, $2, and a termination symbol), and a player continues to reveal symbols until the player has revealed them all or the player has uncovered the termination symbol. If the player receives a two trigger bonus round (e.g. 2 lines trigger the bonus round), then the values can be multiplied by 2 to ($2. $4, termination symbol). Alternatively, a table can be used which results in prechosen values (e.g. $2, $3) for two bonus triggers. Alternatively, a formulaic method can be used, for instance the first values can be used added with the first values (or other values) multiplied by a value. For example, the standard trigger values can be used, and for each additional trigger value used, the values (or expectation of the bonus round) can be increased by the standard trigger values multiplied by a constant (the constant can change for each number of bonus triggers).

From operation 906, the method proceeds to operation 908, which plays (or executes) the bonus round according to the award scheme as determined in operation 906.

In describing yet a further embodiment of the present invention, it is noted that currently when a player enters a bonus round, the amount of credits the player has in the main credit meter does not change until the bonus round is over. The main credit meter is the main display which shows the player how many total credits the player has in the machine. When the bonus round is over, the amount of credits a player has in the main credit meter increases by the amount that the player has won on the bonus game.

In yet a further embodiment, a further variation of slot machine game can be implemented. A slot machine can comprise a 4×2 field. Table I illustrates a possible output of the machine.

TABLE I

| | | | |
|---|---|---|---|
| 7 | blank | cherry | 7 |
| blank | 7 | 7 | cherry |

Note that in this example, there are four reels and two symbols on each reel. There can be a maximum of 16 lines (2ˆ4). Each possible line is illustrated in Table II.

TABLE II

| Line | Combination |
|---|---|
| 1 | TTTT |
| 2 | TTTB |
| 3 | TTBT |
| 4 | TTBB |
| 5 | TBTT |
| 6 | TBTB |
| 7 | TBBT |
| 8 | TBBB |
| 9 | BTTT |
| 10 | BTTB |
| 11 | BTBT |
| 12 | BTBB |
| 13 | BBTT |
| 14 | BBTB |
| 15 | BBBT |
| 16 | BBBB |

The lines can be derived from assigning a binary number for each line, where 0 can represent the top symbol (T) and 1 can represent the bottom symbol (B). In the example in Table II, the binary number is actually the line # minus 1 (so that the line numbers start at one instead of 0).

In this way, a slot machine can be played that has lines of some, most, or all combinations of symbols. In the example illustrates in Tables I and II, the slot machine has all possible line combinations possible for a 4×2 slot machine. This is advantageous in that the player does not need to become familiar with all of the lines a machine offers, because the game can use every possible line. In this example, a winning combination is found on line 7 (top bottom bottom top) which is 7 7 7 7. A player playing such a machine with all possible line combinations active immediately should know if he is a winner (or possibly a winner during a spin) because he can easily inspect the symbols spun and identify if winning combinations are still possible. This is an improvement over the current multi line slot games, which may have many confusing lines in which the player must familiarize himself with, and typically the player cannot tell if he has won or not until a game is over and the machine identifies a win to the player.

In a further variation of the above described embodiment, a 5×2 machine can be implemented (5 reels with two vertical symbols), for a total of 2ˆ5=32 lines. It is noted that not all possible lines are required to be used, and in place of vertical reel a unispin symbol can be used (a symbol which spins independently on its own reel).

In a further variation, three rows of symbols can be used, for example a 4×3 slot machine can be implemented with 3ˆ4=81 lines. A 5×3 machine can be implemented with 3ˆ5 lines=243 lines. With these games, winners should typically be easily identifiable by the player. Identifying individual winning lines line by line can be optional by the manufacture because the player can be informed that all possible winning combinations are active.

It is also noted that any and/or all of the above embodiments, configurations, variations of the present invention described above can mixed and matched and used in any combination with one another. Any claim herein can be combined with any others (unless the results are nonsensical). Further, any mathematical formula given above also includes its mathematical equivalents, and also variations thereof such as multiplying any of the individual terms of a formula by a constant(s) or other variable.

Moreover, any description of a component or embodiment herein also includes hardware, software, and configurations which already exist in the prior art and may be necessary to the operation of such component(s) or embodiment(s).

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

APPENDIX A

```
// this program (c) 2004
function set3dcombos( )
{
combos = new Array(8);
for(i=0; i<8; i++) {
   combos[i] = new Array(8);
   for(j=0; j<8; j++) {
      combos[i][j] = new Array(8);
      for (k=0; k<5; k++)
         {combos[i][j][k]=0;}
   }} }
function playreelstop( )
{
mySound=new Sound(this);
mySound.attachSound("reelstop");
mySound.setVolume(100);
mySound.start( );
}
function playwin0( )
{
mySound=new Sound(this);
mySound.attachSound("smallwin");
mySound.setVolume(100);
mySound.start( );
}
function playlever( )
{
mySound=new Sound(this);
mySound.attachSound("lever");
mySound.setVolume(100);
mySound.start( );
}
function paywin (symb1,symb2,symb3) {
win1=combos[symb1][symb2][symb3];
win=pays[win1];
money=money+win;
if (win>0) {playwin0( );}
thiswin=thiswin+win;
winbox.text="$"+thiswin;
moneybox.text="$"+money;
}
function showspin( )
{
spins++;
if (spins==reelspins) {playreelstop( ); }
if ((spins==reelspins) and (reel=="big")) {clearinterval(intervalID);
leftsymbol=s;
attachMovie(name[s],nameid,depth);
a++;
clips[a]=nameid;
_root[nameid]._x=x;
_root[nameid]._y=y;
if (s!=6) {spinmiddletop( );
} else {button._visible=1;}}
if ((spins==reelspins) and (reel=="medtop")) {clearInterval(intervalID);
middletopsymbol=s;spinmiddlemiddle( );
}
if ((spins==reelspins) and (reel1=="medmed"))
{clearinterval(intervalID);middlemiddlesymbol=s;
spinmiddlebottom( );}
if ((spins==reelspins) and (reel=="medbot"))
{clearInterval(intervalID)middlebottomsymbol=s;spinrighttoptop( );
}
if((spins==reelspins) and (reel=="righttoptop")) {clearInterval(intervalID);
```

APPENDIX A-continued

```
if (righttoptop==“yes”) {paywin(leftsymbol,middletopsymbol,s);}
spinrighttopmid( );
}
if ((spins==reelspins) and (reel==“righttopmid”)) {clearInterval(intervalID);
if (righttopmid==“yes”) {paywin(leftsymbol,middletopsymbol,s);}
spinrighttopbot( );
}
if ((spins==reelspins) and (reel==“righttopbot”)) {clearInterval(intervalID);
if (righttopbot==“yes”) {paywin(leftsymbol,middletopsymbol,s);}
spinrightmidtop( );
}
if ((spins==reelspins) and (reel==“rightmidtop”)) {clearInterval(intervalID);
if (rightmidtop==“yes”) {paywin(leftsymbol,middlemiddlesymbol,s);}
spinrightmidmid( );
if ((spins==reelspins) and (reel==“rightmidmid”)) {clearInterval(intervalID);
if (rightmidmid==“yes”) {paywin(leftsymbol, middlemiddlesymbol,s);}
spinrightmidbot( ); }
if ((spins==reel spins) and (reel==“rightmidbot”)) {clearInterval(intervalID);
if (rightmidbot==“yes”) {paywin(leftsymbol,middlemiddlesymbol,s);}
spinrightbottop( );}
if ((spins==reelspins) and (reel=“rightbottop”)) {clearInterval(intervalID);
if(rightbottop==“yes”) {paywin(leftsymbol,middlebottomsymbol,s);}
spinrightbotmid( );}
if ((spins==reelspins) and (reel==“rightbotmid”)) {clearInterval(intervalID);
if (rightbotmid==“yes”) {paywin(leftsymbol,middlebottomsymbol,s);}
spinrightbotbot( );}
if ((spins==reelspins) and (reel==“rightbotbot”)) {clearInterval(intervalID);
if (rightbotbot==“yes”) {paywin(leftsymbol,middlebottomsymbol,s);}
button._visible=1;
}
if (spins!=reelspins) {
if (reel==“big”) {
n=Math.floor (Math.random( )*64+1);
if (n<3) {s=5;}
else if (n<7) {s=1;}
else if (n<13) {s=4;}
else if (n<22) {s=3;}
else if (n<32) {s=2;}
else if (n<43) {s=7;}
else {s=6;}}
else if ((reel==“medtop”) or (reel=“medmed”) or (reel=“medbot”)) {
n=Math.floor (Math.random( )*64+1);
if (n<3) {s=5;}
else if (n<6) {s=1;}
else if (n<11) {s=4; }
else if (n<19) {s=3;}
else if (n<28) {s=2;}
else if (n<37) {s=7;}
else {s=6;}}
else {
n=Math.floor (Math.random( )*64+1);
if (n<2) {s=5;}
else if (n<4) {s=1;}
else if (n<8) {s=4;}
else if (n<15) {s=3;}
else if (n<23) {s=2;}
else if (n<32) {s=7;}
else {s=6;}}
nameid=name[s]+reel+“id”;
a++; clips[a]=nameid;
attachMovie(name[s],nameid,depth);
_root[nameid]._x=x;
_root[nameid]._y=y;}
}
function spinbig( )
{spins=0;
money=money-9;
moneybox.text=“$”+money;
reel=“big”;
name[1]=“abig7”; name[2]=“abigbarl”; name[3]=“abigbar2”;name[4]=“abigbar3”;
name[5]=“abigwild”; name[6]=“abigblank”; name[7]=“abigcherry”;
x=bigx;y=bigy;
intervalID=setInterval(showspin, inter);
depth=1;
}
function spinmiddletop( )
{spins=0;
reel=“medtop”;
```

APPENDIX A-continued

```
name[1]="amed7"; name [2]="amedbar1"; name[3]="amedbar2";
name[4]="amedbar3";name[5]="amedwild";name[6]="amedblank";name[7]="amedcherry"
x=medtopx;y=medtopy;
depth=2;
intervalID=setInterval(showspin, inter);
}
function spinmiddlemiddle( )
{spins=0;
reel="medmed";
name[1]="amed7"; name[2]="amedbar1"; name[3]="amedbar2";
name[4]="amedbar3";name[5]="amedwild";name[6]="amedblank";name[7]="amedcherry";
x=medmedx,y=medmedy;
depth=3;
intervalID=setInterval(showspin, inter);
}
function spinmiddlebottom( )
{spins=0;
reel="medbot";
name[1]="amed7"; name[2]="amedbar1"; name[3]="amedbar2";
name[4]="amedbar3";name[5]="amedwild";name[6]="amedblank";name[7]="amedcherry";
x=medbotx;y=medboty;
depth=4;
intervalID=setInterval(showspin, inter);
}
function spinrighttoptop( )
{spins=0; righttoptop="yes";
reel="righttoptop";
name[1]=asmall7"; name[2]="asmallbar1"; name[3]="asmallbar2";
name[4]="asmallbar3";name[5]="asmallwild";name[6]="asmallblank";name[7]="asmallcherry";
x=righttoptopx;y=righttoptopy;
depth=5;
if ((leftsymbol!==middletopsymbol) and ((leftsymbol!=5) and
(middletopsymbol!=5)) or (leftsymbol==6) or (middletopsymbol==6))
{spins=reelspins; righttoptop="no";}
intervalID=setInterval(showspin, inter);
}
function spinrighttopmid( )
{spins=0;
reel="righttopmid"; righttopmid="yes";
name[1]="asmall7"; name[2]="asmallbar1"; name[3]="asmallbar2";
name[4]="asmallbar3";name[5]="asmallwild";name[6]="asmallblank";name[7]="asmallcherry"
x=righttopmidx;y=righttopmidy;
depth=6;
if ((leftsymbol!=middletopsymbol) and ((leftsymbol!=5) and
(middletopsymbol!=5)) or (leftsymbol==6) or (middletopsymbol==6)){spins=reelspins;
righttopmid="no";}
intervalID=setInterval(showspin, inter);
}
function spinrighttopbot( )
{spins=0;
reel="righttopbot"; righttopbot="yes";
name[1]="asmall7"; name[2]="asmallbar1"; name[3]="asmallbar2";
name[4]="asmallbar3";name[5]="asmallwild";name[6]="asmallblank";name[7]="asmallcherry";
x=righttopbotx;y=righttopboty;
depth=7;
if ((leftsymbol!=middletopsymbol) and aleftsymbol!=5) and
(middletopsymbol!=5)) or (leftsymbol==6) or (middletopsymbol==6))
{spins=reelspins; righttopbot="no";}
intervalID=setInterval(showspin, inter);
}
function spinrightmidtop( )
{spins=0;
reel="rightmidtop"; rightmidtop="yes";
name[1]="asmall7"; name[2]="asmallbar1"; name[3]="asmallbar2";
name[4]="asmallbar3";name[5]="asmallwild";name[6]="asmallblank";name[7]="asmallcherry"
x=rightmidtopx;y=rightmidtopy;
depth=8;
if ((leftsymbol!=middlemiddlesymbol) and ((leftsymbol!=5) and
(middlemiddlesymbol!=5)) or (leftsymbol==6) or (middlemiddlesymbol==6))
{spins=reelspins; rightmidtop="no";}
intervalID=setInterval(showspin, inter);
}
function spinrightmidmid( )
{spins=0;reel="rightmidmid"; rightmidmid="yes";
name[1]="asmall7"; name[2]="asmallbar1"; name[3]="asmallbar2";
name[4]="asmallbar3";name[5]="asmallwild";name[6]="asmallblank";name[7]="asmallcherry";
x=rightmidmidx;y=rightmidmidy;
depth=9;
if ((leftsymbol!=middlemiddlesymbol) and ((leftsymbol!=5) and
(middlemiddlesymbol!=5)) or (leftsymbol==6) or (middlemiddlesymbol==6))
```

APPENDIX A-continued

```
{spins=reelspins; rightmidmid="no";}
intervalID=setInterval(showspin, inter);
}
function spinrightmidbot( )
{spins=0;
reel="rightmidbot"; rightmidbot="yes";
name[1]="asmall7"; name[2]="asmallbar1"; name[3]="asmallbar2";
name[4]="asmallbar3";name[5]="asmallwild";name[6]="asmallblank";name[7]="asmallcherry";
x=rightmidbotx;y=rightmidboty;
depth=10;
if ((leftsymbol!=middlemiddlesymbol) and ((leftsymbol!=5) and
(middlemiddlesymbol!=5)) or (leftsymbol==6) or
(middlemiddlesymbol==6)) {spins=reelspins; rightmidbot="no";}
intervalID=setInterval(showspin, inter);
}
function spinrightbottop( )
{spins=0;
reel="rightbottop"; rightbottop="yes";
name[1]="asmall7"; name[2]="asmallbar1"; name[3]="asmallbar2";
name[4]="asmallbar3";name[5]="asmallwild";name[6]="asmallblank";name[7]="asmallcherry";
x=rightbottopx;y=rightbottopy;
depth=12;
if ((leftsymbol!=middlebottomsymbol) and ((leftsymbol!=5) and
(middlebottomsymbol!=5)) or (leftsymbol==6) or
(middlebottomsymbol==6)) {spins=reelspins; rightbottop="no";}
intervalID=setInterval(showspin, inter);
}
function spinrightbotmid( )
{
spins=0;
reel="rightbotmid"; rightbotmid="yes";
name[1]="asmall7"; name[2]="asmallbar1"; name[3]="asmallbar2";
name[4]="asmallbar3";name[5]="asmallwild";name[6]="asmallblank";name[7]="asmallcherry";
x=rightbotmidx;y=rightbotmidy;
depth=13;
if ((leftsymbol!=middlebottomsymbol) and ((leftsymbol!=5) and
(middlebottomsymbol!=5)) or (leftsymbol==6) or
(middlebottomsymbol==6)){spins=reelspins; rightbotmid="no";}
intervalID=setInterval(showspin, inter); }
function spinrightbotbot( )
{spins=0;
reel="rightbotbot"; rightbotbot="yes";
name[1]="asmall7"; name[2]="asmallbar1"; name[3]="asmallbar2";
name[4]="asmallbar3";name[5]="asmallwild";name[6]="asmallblank";name[7]="asmallcherry";
x=rightbotbotx;y=rightbotboty;
depth=14;
if ((leftsymbol!=middlebottomsymbol) and ((leftsymbol!=5)
and(middlebottomsymbol!=5)) or (leftsymbol==6) or
(middlebottomsymbol==6)){spins=reelspins; rightbotbot="no";}
intervalID=setInterval(showspin, inter);
}
name=[ ]; clips=[ ];a=0;
set3dcombos ( );
for (i=0; i<8; ++i) {
for (j=0; j<8; ++j) {
for (k=0; k<8; ++k) {combos[i][j][k]=0;}}}
combos[7][5][1]=2; combos[7][5][2]=2; combos[7][5][3]=2;combos[7][5][4]=2;
combos[7][5][5]=3; combos[7][5][6]=2; combos[7][5][7]=3;
combos[7][7][1]=2; combos[7][7][2]=2; combos[7][7][3]=2;combos[7][7][4]=2;
combos[7][5][5]=3; combos[7][7][6]=2; combos[7][7][7]=3;
combos[2][2][2]=4; combos[2][2][5]=4; combos[2][5][2]=4; combos[5][2][2]=4;
combos[5][5][2]=4; combos[5][2][5]=4; combos[2][5][5]=4;
combos[3][3][3]=5; combos[3][3][5]=5; combos[3][5][3]=5; combos[5][3][3]=5;
combos[5][5][3]=5; combos[5][3][5]=5; combos[3][5][5]=5;
combos[5][5][1]=2; combos[5][5][2]=2; combos[5][5][3]=2; combos[5][5][4]=2;
combos[5][5][6]=2;
combos[4][4][4]=6; combos[4][4][5]=6; combos[4][5][4]=6; combos[5][4][4]=6;
combos[5][5][4]=6; combos[5][4][5]=6; combos[4][5][5]=6;
combos[1][1][1]=7; combos[1][1][5]=7; combos[1][5][1]=7; combos[5][1][1]=7;
combos[5][5][5]=8;
combos[5][7][7]=3; combos[5][7][6]=2; combos[5][7][1]=2; combos[5][7][2]=2;
combos[5][7][3]=2; combos[5][7][4]=2; combos[5][7][5]=3; combos[5][5][7]=3;
pays=[ ];
pays[1]=0; pays[2]=8; pays[3]=20; pays[4]=40; pays[5]=60; pays[6]=100;
pays[7]=1000; pays[8]=5000; pays[0]=0;
bigx=220;bigy=410; reelspins=125; inter=5;
money=1000; thiswin=0;
moneybox.text="$"+money; winbox.text="$"+thiswin;
medtopx=525;medtopy=150;medmedx=525;medmedy=400;medbotx=525;medboty=645;
righttoptopx=700;righttoptopy=50;
```

APPENDIX A-continued

```
righttopmidx=700;righttopmidy=135; righttopbotx=700;righttopboty=220;
rightmidtopx=700;rightmidtopy=310;
rightmidmidx=700;rightmidmidy=390; rightmidbotx=700;rightmidboty=470;
rightbottopx=700;rightbottopy=560;
rightbotmidx=700;rightbotmidy=645; rightbotbotx=700;rightbotboty=730;
_root["button"].onRelease=function( ) {
button._visible=0;
for (i=0; i<a; ++i) {removeMovieclip (clips[i]);}
thiswin=0;
winbox.text="$"+"0";
playlever( );
spinbig( );}
```

The invention claimed is:

1. A slot machine gaming apparatus, comprising:

a processing unit, configured to execute instructions that perform:

receiving a wager from a player;

spinning reels on a slot machine to an outcome;

providing a bonus round routine, the routine comprising:

providing the player a number of picks, wherein the number of picks is determined based on a number of bonus triggers in the outcome, wherein the player gets X picks for a standard bonus round and the player gets Y picks when there are more bonus triggers than the standard bonus round, Y being greater than X;

displaying a plurality of elements, a number of the plurality of elements being greater than X;

allowing the player to choose only the number of picks of elements out of the plurality of elements and awarding the player a prize associated with each chosen element;

initiating the bonus round routine when the outcome comprises a bonus trigger; and:

an output unit operating with the processing unit.

2. A method to play a game, the method comprising:

executing instructions on an electronic processing unit configured to perform:

receiving a wager from a player;

spinning reels on a slot machine to an outcome;

providing a bonus round routine, the routine comprising:

providing the player a number of picks, wherein the number of picks is determined based on a number of bonus triggers in the outcome, wherein the player gets X picks for a standard bonus round and the player gets Y picks when there are more bonus triggers than the standard bonus round, Y being greater than X;

displaying a plurality of elements, a number of the plurality of elements being greater than X;

allowing the player to choose only the number of picks of elements out of the plurality of elements and awarding the player a prize associated with each chosen element; and initiating the bonus round routine when the outcome comprises a bonus trigger.

3. A method to play a game, the method comprising:

using, by the player, an electronic computer with an electronic output unit;

placing, by a player using the computer, a wager;

viewing, by the player, spinning reels on a slot machine displayed on the output unit, wherein the outcome comprises a bonus trigger;

viewing, by the player, a bonus round displayed on the output unit, the bonus round displaying a plurality of elements, a number of the plurality of elements being greater than X; and choosing, by the player using the computer, only a number of picks of elements out of the plurality of elements, wherein the player receives a prize associated with each chosen element, wherein the number of picks is determined based on a number of bonus triggers in the outcome, wherein the player gets X picks for a standard bonus round and the player gets Y picks when there are more bonus triggers than the standard bonus round, Y being greater than X.

* * * * *